United States Patent
Szawarski et al.

(10) Patent No.: US 9,643,487 B2
(45) Date of Patent: May 9, 2017

(54) VEHICLE FUEL FILLER ASSEMBLY

(71) Applicant: Ford Global Technologies, LLC, Dearborn, MI (US)

(72) Inventors: Hubert Szawarski, Waterford, MI (US); Mark A. Cuddihy, New Boston, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/848,373

(22) Filed: Sep. 9, 2015

(65) Prior Publication Data
US 2017/0066321 A1   Mar. 9, 2017

(51) Int. Cl.
*B60K 15/05*   (2006.01)

(52) U.S. Cl.
CPC ...... *B60K 15/05* (2013.01); *B60K 2015/0546* (2013.01)

(58) Field of Classification Search
CPC ............ B60K 2015/0546; B60K 15/05; B60K 2015/053; B60K 2015/0561; B60K 15/04; B60K 28/10; B60L 11/1818; B60L 2250/10; B60L 2250/16; B60J 10/08; B60J 5/00
USPC .......... 296/97.22, 136.01, 146.9, 155, 183.1, 296/207, 37.8; 220/86.2, 211, 203.01, 220/375, 378, 829, 746
See application file for complete search history.

(56) References Cited

U.S. PATENT DOCUMENTS

| 6,011,484 | A | * | 1/2000 | Dietl | B60K 15/05 |
| | | | | | 307/10.1 |
| 7,195,093 | B1 | * | 3/2007 | Ahmadi | B60K 28/12 |
| | | | | | 180/286 |
| 7,311,348 | B1 | * | 12/2007 | Bang | B60K 15/0406 |
| | | | | | 220/86.2 |
| 8,210,306 | B2 | | 7/2012 | Zuck et al. | |
| 2009/0079225 | A1 | | 3/2009 | Katou | |
| 2009/0194194 | A1 | | 8/2009 | Wilkinson | |
| 2012/0319830 | A1 | | 12/2012 | Rovik | |
| 2013/0076059 | A1 | | 3/2013 | Zalan et al. | |
| 2013/0158744 | A1 | * | 6/2013 | Inoue | G07C 9/00309 |
| | | | | | 701/2 |
| 2015/0048644 | A1 | | 2/2015 | Georgi et al. | |

FOREIGN PATENT DOCUMENTS

KR   101304265 B1   9/2013

OTHER PUBLICATIONS

Great Britain Search Report dated Jan. 18, 2017 for Great Britain Application No. GB1615259.7, 3 pgs.

* cited by examiner

*Primary Examiner* — Glenn Dayoan
*Assistant Examiner* — Sunsurraye Westbrook
(74) *Attorney, Agent, or Firm* — Frank A. MacKenzie; Brooks Kushman P.C.

(57) ABSTRACT

A vehicle and a fuel filler assembly may be provided. The fuel filler assembly may include a housing, a panel assembly, and a sensor assembly. The panel assembly may be carried by the housing and may include a door and a hinge extending from the door. The hinge may have indicia disposed thereon and the sensor assembly may be configured to provide a signal indicative of a location of the indicia relative to the housing.

17 Claims, 2 Drawing Sheets

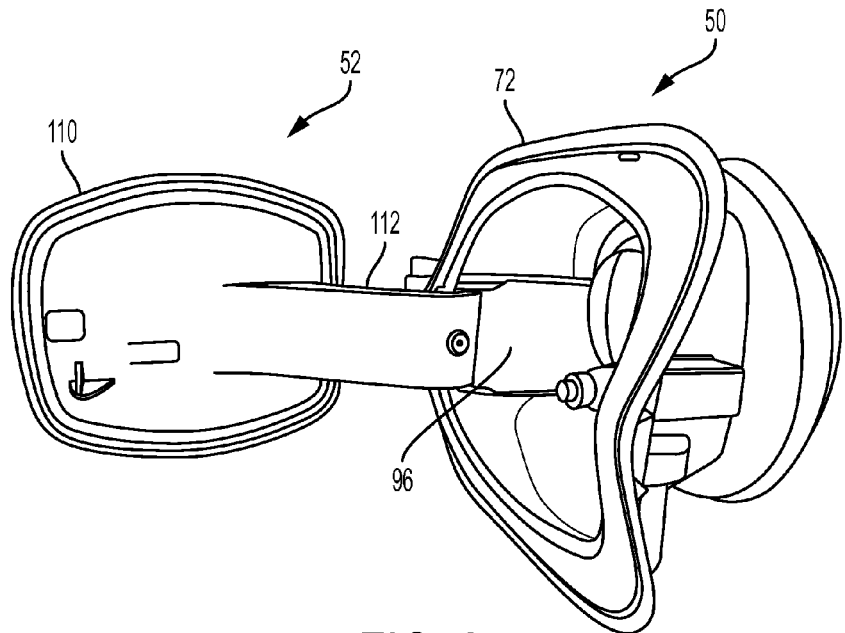
FIG. 2
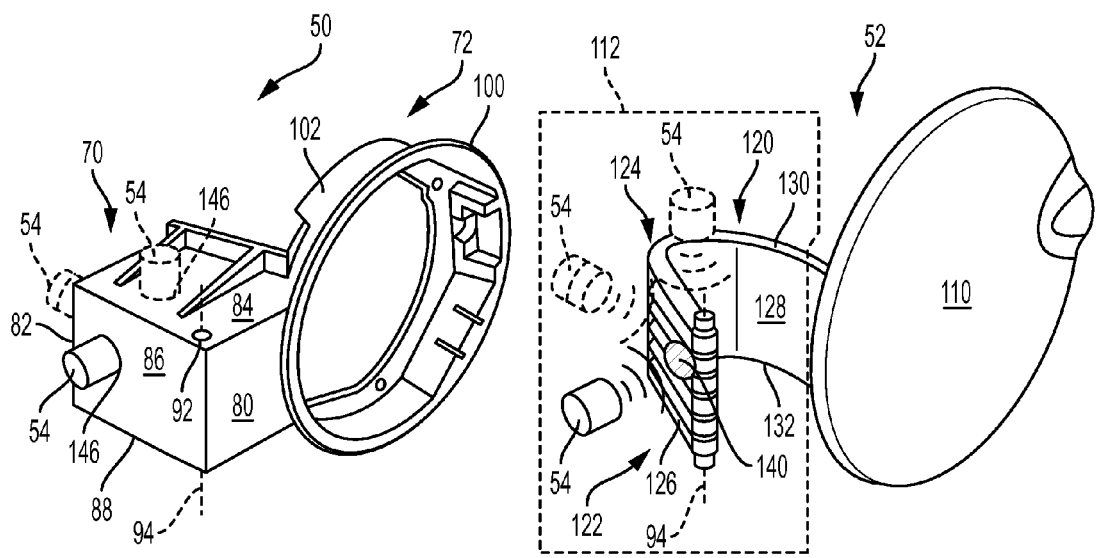
FIG. 3
FIG. 4

VEHICLE FUEL FILLER ASSEMBLY

TECHNICAL FIELD

The present disclosure relates to vehicle fuel filler assemblies.

BACKGROUND

Vehicles may be equipped with fuel tanks or other energy storage devices having fill pipes with a capped end. A fuel filler door may be pivotally disposed over the capped end. The combination of the fuel filler door and the capped end may inhibit contaminants from entering the fuel tank. Commonly, the fuel filler door and the capped end are removed to permit a customer to add fuel to the fuel tank or energy to the energy storage device. Some customers may inadvertently leave the fuel filler door open or the capped end off. The open fuel filler door may negatively impact fuel economy due to aerodynamic drag, may permit contaminants to enter the fuel tank and/or energy storage device, or may present security issues.

SUMMARY

A vehicle may include a housing, a panel assembly, a proximity sensor assembly, and a controller. The panel assembly may be carried by the housing and may include a door and a hinge extending from the door. The hinge may have indicia disposed thereon and the proximity sensor assembly may be configured to provide a signal indicative of a location of the indicia relative to the housing. The controller may be programmed to output for display a fuel door open-closed indicator based on the signal.

A fuel filler assembly may include a housing, a panel assembly, and a sensor assembly. The panel assembly may be connected to the housing and may be provided with a door and a hinge, having indicia disposed thereon, extending from the door. The sensor assembly may be disposed proximate the hinge and may be configured to detect the indicia.

A fuel filler assembly may include a housing, a panel assembly, and a non-contacting sensor assembly. The panel assembly may include a door and a hinge extending from the door and may be carried by the housing. The non-contacting sensor assembly may be configured to provide a signal indicative of a location of indicia disposed on the hinge relative to the housing.

BRIEF DESCRIPTION OF THE DRAWINGS

FIG. 2 is a perspective view of the fuel filler assembly.

FIG. 3 is a perspective view of the housing of the fuel filler assembly.

FIG. 4 is a perspective view of the door and the hinge of the fuel filler assembly.

DETAILED DESCRIPTION

Figure 1:
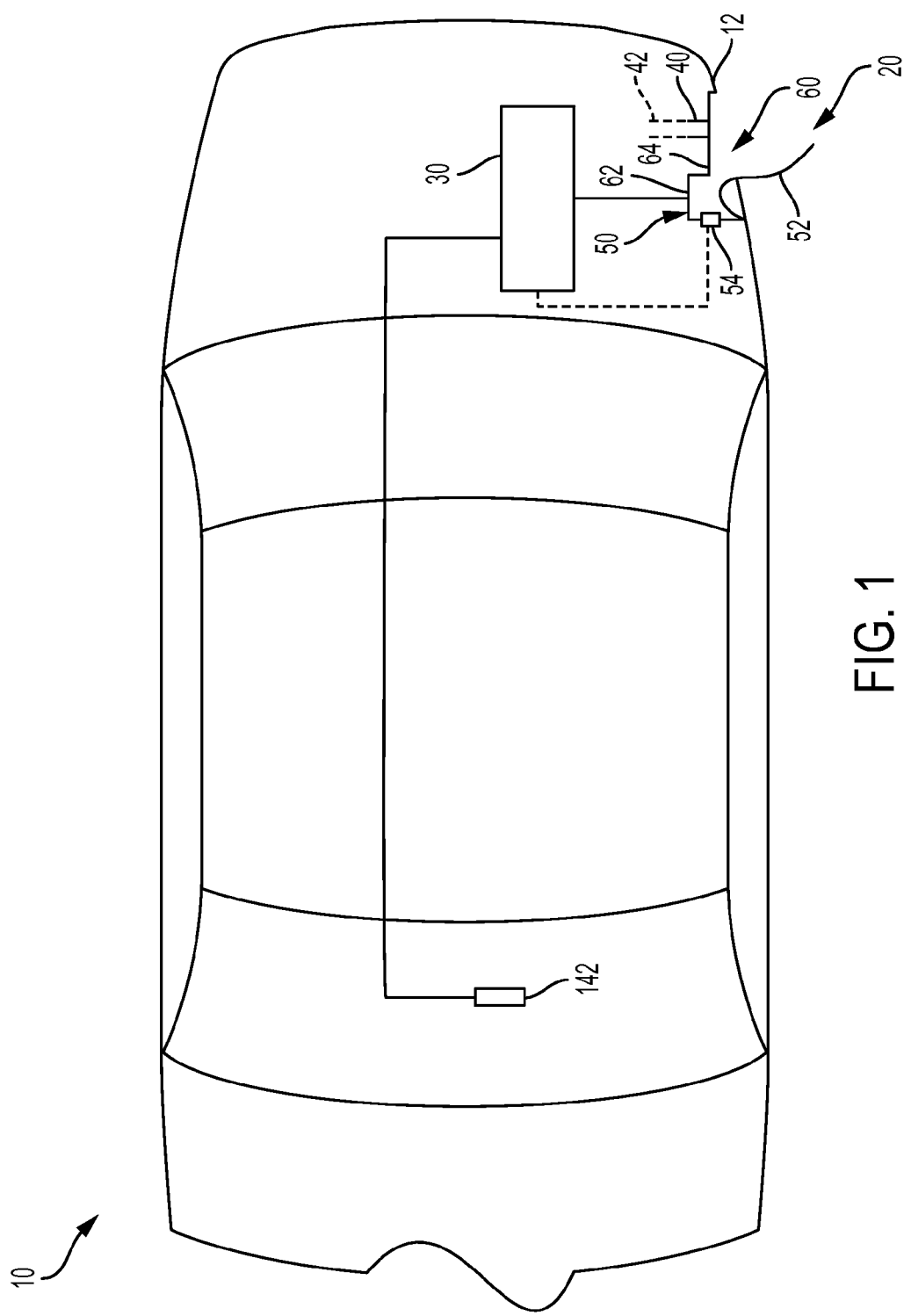
FIG. 1 is a schematic representation of a vehicle having a fuel filler assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1 a vehicle 10 is shown. The vehicle 10 may be a motor vehicle like a truck, bus, farm equipment, military transport, weaponry vehicle, or cargo loading equipment for land, air, or marine vessels. The vehicle 10 having a body panel 12 may include a fuel filler assembly 20 and a controller 30.

The fuel filler assembly 20 may be disposed on the body panel 12 proximate a corner of a vehicle 10. The fuel filler assembly 20 may be operatively connected to a fuel tank via a fuel filler pipe 40. In at least one embodiment, the fuel filler assembly 20 may be operatively connected to an energy storage device such as a traction battery via an electrical conduit 42.

Referring to FIGS. 1 through 3, the fuel filler assembly 20 may include a housing 50, a panel assembly 52, and a sensor assembly 54. The body panel 12 may define a recessed area 60 that receives the fuel filler assembly 20. More specifically, the housing 50 may extend through the body panel 12 proximate the recessed area 60. The recessed area 60 may extend into the vehicle body and define a first stepped area 62 and a second stepped area 64. The first stepped area 62 may be disposed closer to a centerline of the vehicle than the second stepped area 64.

The housing 50 may include a first housing component 70 and a second housing component 72. The first housing component 70 and the second housing component 72 may be integrally formed such that they form a unitary component. The first housing component 70 may be received within the first stepped area 62. The first housing component 70 may be an enclosure having a first wall 80 spaced apart from and disposed opposite a second wall 82. The first wall 80 and the second wall 82 may be substantially planar. The first wall 80 may be disposed substantially parallel to the second wall 82.

A third wall 84, a fourth wall 86, and a fifth wall 88 may extend between the first wall 80 and the second wall 82. The third wall 84, the fourth wall 86, and the fifth wall 88 may be substantially planar. The third wall 84 may be a top wall of the first housing component 70 and may extend from a top portion of the first wall 80 to a top portion of the second wall 82. The third wall 84 may be disposed substantially perpendicular to the first wall 80 and the second wall 82.

The fourth wall 86 may be disposed adjacent to the third wall 84. In at least one embodiment the fourth wall 86 may extend from and be disposed substantially perpendicular to the third wall 84. The fourth wall 86 may be a side wall of the first housing component 70 and may extend from a side portion of the first wall 80 to a side portion of the second wall 82. The fourth wall 86 may be disposed substantially perpendicular to the first wall 80 and the second wall 82. In at least one embodiment, the fourth wall 86 may define an opening disposed proximate the first wall 80.

The fifth wall 88 may be disposed adjacent to the fourth wall 86. The fifth wall 88 may be spaced apart from and disposed opposite the third wall 84. The fifth wall 88 may be a bottom wall of the first housing component 70 and may extend from a bottom portion of the first wall 80 to a bottom portion of the second wall 82. The fifth wall 88 may be disposed substantially perpendicular to the first wall 80 and the second wall 82.

The third wall 84 and the fifth wall 88 may define a pivot 92. The pivot 92 may be disposed proximate the fourth wall 86. The pivot 92 may define a pivot axis 94 about which the panel assembly 52 may pivot between a closed position to an open position. In at least one embodiment, the pivot 92 may be completely disposed within the first housing component 70 and may be disposed opposite a second pivot defined by the third wall 84. Referring to FIG. 4, the combination of the first wall 80, the second wall 82, the third wall 84, the fourth wall 86, and the fifth wall 88 of the first housing component 70 may define a cavity 96 as shown in FIG. 2.

The second housing component 72 may be received within the second stepped area 64. The second housing component 72 may extend away from the first housing component 70. The second housing component 72 may extend from the first wall 80, the third wall 84, and the fifth wall 88. The second housing component 72 may be disposed opposite the fourth wall 86.

The second housing component 72 may define a filler neck having a flange portion 100 and a neck portion 102. The flange portion 100 may extend about the neck portion 102. The flange portion 100 may engage the body panel 12 proximate the second stepped area 64. The neck portion 102 may extend away from the flange portion 100 towards the fuel filler pipe 40 or the electrical conduit 42.

The panel assembly 52 may be carried by the housing 50. The panel assembly may include a door 110 and a hinge 112. The hinge 112 may extend from the door 110 and secure/connect the panel assembly 52 to the first housing component 70. In at least one embodiment, the hinge 112 may have a generally arcuate or U-shaped profile. The hinge 112 may have a first portion 120 connected to the door 110, a second portion 122 pivotally connected to the pivot 92 of the first housing component 70, and an intermediate portion 124 extending between the first portion 120 and the second portion 122.

The hinge 112 may have a first side surface 126 spaced apart from and disposed opposite a second side surface 128. The first side surface 126 may be disposed substantially parallel to the second side surface 128. A top surface 130 may extend between the first side surface 126 and the second side surface 128. A bottom surface 132 may be spaced apart from and disposed opposite the top surface 130. The bottom surface 132 may extend between the first side surface 126 and the second side surface 128.

The hinge 112 may enable the door 110 to move between open and closed positions. While the door 110 is in the closed position, at least a portion of the hinge 112 may be received within the cavity 96 of the first housing component 70. In at least one embodiment, the second portion 122 in the intermediate portion 124 may be completely disposed within the cavity 96 of the first housing component 70. The first side surface 126 may be spaced apart from an interior surface of the first wall 80, the second wall 82, the third wall 84, the fourth wall 86, and the fifth wall 88 while the door 110 is in the closed position. The door 110 may engage the flange portion 100 when in the closed position. The flange portion 100 may inhibit further pivoting or rotation of the door 110 towards the recessed area 60. While the door 110 is in the open position, the second portion 122 may be at least partially disposed within the cavity 96 of the first housing component 70. The second side surface 128 may engage at least one of the flange portion 100 and the neck portion 102.

Indicia 140 may be disposed on the hinge 112. The indicia may be spaced apart from the pivot axis 94. The indicia 140 may be configured as a position feature or a location feature that may be detected by the sensor assembly 54 to determine a position or location of the indicia 140. The indicia 140 may be disposed on the first side surface 126 such that the indicia 140 may be received within the cavity 96 of the first housing component 70 when the panel assembly 52 is in a closed position. In at least one embodiment, the hinge 112 may not be provided with the indicia 140. At least one of the first side surface 126, the top surface 130, and the bottom surface 132 may be designed to be detected by the sensor assembly 54 based on the position of the sensor assembly 54 relative to the hinge 112. For example, if the sensor assembly 54 is configured as an infrared sensor, at least one of the first side surface 126, the top surface 130, and the bottom surface 132 may be configured as a white flat surface, detectable by the infrared sensor. For example, if the sensor assembly 54 is configured as an ultrasonic sensor, at least one of the first side surface 126, the top surface 130, and the bottom surface 132 may be configured as a substantially smooth flat surface disposed substantially perpendicular to the sensor assembly 54 that may reflect ultrasonic signals emitted by the ultrasonic sensor.

The sensor assembly 54 may be configured as a non-contacting proximity sensor assembly. For example, the sensor assembly 54 may monitor the location/position of the door 110 and/or hinge 112 and ultimately the panel assembly 52 relative to the first housing component 70 of the housing 50 in a non-contacting proximity sensor arrangement. Examples of non-contacting proximity sensors may include infrared sensors, ultrasonic sensors, or LIDAR sensors. The sensor assembly 54 may extend through an aperture 146 defined by the first housing component 70. The aperture 146 may be defined by the second wall 82, the third wall 84, the fourth wall 86, or the fifth wall 88. The aperture 146 and the sensor assembly 54 may be configured such that the sensor assembly 54 is spaced apart from and disposed above the indicia 140 and the first side surface 126. In at least one embodiment, the aperture 146 and the sensor assembly 54 may be configured such that the sensor assembly 54 is spaced apart from and faces towards the indicia 140 and the first side surface 126. In at least one embodiment, the aperture 146 and sensor assembly 54 may be configured such that the sensor assembly 54 is spaced apart from and disposed below the indicia 140 and the first side surface 126. The aperture 146 can also be covered by a clear plastic material that passes through the signal from sensor 54 and at the same time blocks the contamination of the sensor 54.

The non-contacting sensor assembly may be an optical sensor arrangement, a visual sensor arrangement, a magnetic field sensor arrangement, or the like. In an optical or visual sensor arrangement, the indicia 140 may include one or more markings, reflectors or infrared reflectors, tinted or shaded sections. The shaded sections or markings may be disposed on or integrated with the hinge 112 in any suitable manner, such as by printing or with an adhesive.

The indicia 140 may be disposed proximate the first side surface 126 or the second side surface 128 of the hinge 112. In at least one embodiment, the indicia 140 may be disposed proximate the top surface 130 or the bottom surface 132 of the hinge 112. The indicia 140 may be spaced apart from and not engage the sensor assembly 54. As shown in FIGS. 3 and 4, the sensor assembly 54 may be placed in various positions, indicated by the dashed lines, to detect a surface of the hinge 112 and/or the indicia 140. The shaded sections or markings may be adapted to at least partially reflect a signal transmitted from the sensor assembly 54 so that a reflected signal may be received by the sensor assembly 54. The sensor assembly 54 may output a signal or electromagnetic radiation, such as light or a laser beam that may or may not be in the visible light spectrum that may be reflected off of the indicia 140. The reflected signal may be detected by the sensor assembly 54 and the reflected signal strength may vary as the location/position of the hinge 112 moves relative to the housing 50.

In a magnetic field sensor arrangement, the indicia 140 may be configured as a magnetic emitter (or magnet) and the sensor assembly 54 may include a magnetic flux sensor. The magnetic flux sensor may detect a magnetic field emitted from the indicia 140 that may be disposed on the hinge 112. The strength of the magnetic field may be proportional to a distance between the magnetic flux sensor and the indicia. As such, the strength of the magnetic field that is detected by the magnetic flux sensor may decrease as the distance between the magnetic flux sensor and the indicia 140 increases as the panel assembly 52 moves towards the open position.

The sensor assembly 54 may detect the location/position of the hinge 112 via indicia 140. The location/position of the hinge 112 may be indicative of whether the door 110 and ultimately the panel assembly 52 is in the open or closed position. The sensor assembly 54 may detect the position of the hinge 112 before, during, or after pivoting or rotation of the panel assembly 52 from a closed position to an open position. The sensor assembly 54 may provide a signal indicative of the location/position of the indicia 140 to the controller 30.

The controller 30 may provide information regarding the position of the door 110 of the panel assembly 52 to a vehicle operator via a user interface 142. The user interface 142 may be of any suitable type or types such as a display, a touchscreen, a speaker, a voice command or speech recognition system, or the like. The controller 30 may receive the signal and calculate or determine the location/position of the hinge 112 and ultimately the position of the door 110 of the panel assembly 52. The controller 30 may output for display a fuel door open-close indicator based on the signal. The fuel door open-close indicator may be displayed via the user interface 142.

In at least one embodiment, a warning may be output for display via the user interface 142 indicative of an open door 110 of the panel assembly 52 upon ignition ON or if the vehicle 10 is traveling at a vehicle speed greater than a threshold and/or a change in a transmission gear selector position from a park/neutral position to a drive or reverse position. The warning may be an audible, visual, or tactile warning or a warning that is combinations thereof may be provided to a vehicle operator when the door 110 of the panel assembly 52 is in the open position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a housing;
   a panel assembly including a door, and a hinge extending from the door and carried by the housing, the hinge having reflective indicia thereon;
   a proximity sensor assembly configured to provide a signal indicative of a location of the indicia relative to the housing based on light reflected from the indicia; and
   a controller programmed to output for display a fuel door open-closed indicator based on the signal.

2. The vehicle of claim 1 wherein the indicia is spaced apart from and does not engage the proximity sensor assembly.

3. The vehicle of claim 1 wherein the housing defines an aperture through which the proximity sensor assembly extends.

4. The vehicle of claim 3 wherein the proximity sensor assembly is spaced apart from and disposed above the indicia.

5. The vehicle of claim 3 wherein the proximity sensor assembly is spaced apart from and faces towards the indicia.

6. The vehicle of claim 3 wherein the proximity sensor assembly is spaced apart from and disposed below the indicia.

7. A fuel filler assembly comprising:
   a housing;
   a panel assembly provided with a door, and a hinge extending from the door and connected to the housing, the hinge having indicia defining a reflective section disposed thereon; and
   a sensor assembly disposed proximate the hinge and configured to detect light reflected from the indicia.

8. The fuel filler assembly of claim 7 wherein the panel assembly rotates about a pivot axis from a closed position to an open position and the indicia is received within the housing when the panel assembly is in the closed position.

9. The fuel filler assembly of claim 7 wherein the sensor assembly is spaced apart from and faces towards the indicia.

10. A fuel filler assembly comprising:
    a housing;
    a panel assembly including a door, and a hinge extending from the door and carried by the housing, the hinge having indicia defining a reflective section thereon; and
    a non-contacting sensor assembly configured to provide a signal indicative of a location of the indicia relative to the housing based on transmission of light reflected off the reflective section being received by the non-contacting sensor assembly.

11. The fuel filler assembly of claim 10 wherein the housing defines an aperture through which the non-contacting sensor assembly extends.

12. The fuel filler assembly of claim 10 wherein the non-contacting sensor assembly is spaced apart from and disposed above the indicia.

13. The fuel filler assembly of claim 10 wherein the non-contacting sensor assembly is spaced apart from and faces towards a side surface of the hinge.

14. The fuel filler assembly of claim 13 wherein the non-contacting sensor assembly provides a signal indicative of an open position of the door to a controller based on a location of the indicia.

15. The fuel filler assembly of claim 14 wherein a warning is output for display via a user interface indicative of an open door based on the signal.

16. The fuel filler assembly of claim 10 wherein the non-contacting sensor assembly includes an infrared sensor.

17. The fuel filler assembly of claim 10 wherein the non-contacting sensor assembly includes an ultrasonic sensor.

* * * * *